(12) United States Patent
Seetharam et al.

(10) Patent No.: US 10,664,829 B1
(45) Date of Patent: *May 26, 2020

(54) SYSTEM AND METHOD FOR CONVEYING CARD DATA USING MATRIX BAR CODES

(71) Applicant: Ingenico Inc., Alpharetta, GA (US)

(72) Inventors: Sriram Seetharam, North Chelmsford, MA (US); Scott Goldthwaite, Hull, MA (US); Christopher Rotsaert, Boston, MA (US)

(73) Assignee: Ingenico Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,439

(22) Filed: Aug. 12, 2019

Related U.S. Application Data

(63) Continuation of application No. 14/830,129, filed on Aug. 19, 2015, now Pat. No. 10,380,580.

(60) Provisional application No. 62/041,821, filed on Aug. 26, 2014.

(51) Int. Cl.
*G06Q 20/34* (2012.01)
*G06Q 20/32* (2012.01)
*G06K 19/06* (2006.01)

(52) U.S. Cl.
CPC ..... *G06Q 20/346* (2013.01); *G06K 19/06037* (2013.01); *G06K 19/06112* (2013.01); *G06Q 20/3276* (2013.01); *G06Q 20/352* (2013.01)

(58) Field of Classification Search
CPC .... G06Q 20/40; G06Q 40/12; G06Q 30/0225; G06Q 30/02; G06Q 20/10; G06Q 20/208; G06Q 20/204; G06Q 20/20; G06Q 20/346; G06Q 20/352; G06Q 20/3276; G06K 19/06037; G06K 19/06112
See application file for complete search history.

(56) References Cited

U.S. PATENT DOCUMENTS

| | | |
|---|---|---|
| 9,312,902 B1 | 4/2016 | Visser |
| 9,805,354 B2 | 10/2017 | Dimokas |
| 2003/0144035 A1 | 7/2003 | Weinblatt et al. |
| 2009/0032584 A1 | 2/2009 | Yamada et al. |
| 2012/0138679 A1 | 6/2012 | Doyle |
| 2013/0140355 A1 | 6/2013 | Qu et al. |
| 2014/0096215 A1 | 4/2014 | Hessler |
| 2014/0258135 A1 | 9/2014 | Park et al. |
| 2014/0279474 A1 | 9/2014 | Evans et al. |

OTHER PUBLICATIONS

"Technology—Kuapay aim to replace credit cards with smartphone QR codes," written by Simply Zesty on Aug. 17, 2011 (3 pages).

*Primary Examiner* — Sonji N Johnson
(74) *Attorney, Agent, or Firm* — Nutter McClennen & Fish LLP

(57) ABSTRACT

User credit card data or smart chip data or Near Field Communication data is easily transferred from a card reader to a host device via a matrix bar code such as a Quick Response (QR) code. Data transfer is performed by converting the card data into matrix bar code and allowing the host device to take an image and process the image to obtain the card data. Card reader will convert magnetic signal/smart chip/NFC data into machine readable form and then convert it into matrix bar code to be consumed by a device that is capable of capturing the matrix bar code. The card reader has the ability to encrypt the data before converting it into a matrix bar code.

30 Claims, 13 Drawing Sheets

| Data in the magnetic card | Data in the QR code (same as magnetic card) when not encrypted |
|---|---|
| %B1234567890123456789^ My Credit Card Holder Name ^1212120000000000000?;1234567890123456789=12121 2000000000000000? | %B1234567890123456789^ My Credit Card Holder Name ^1212120000000000000?;1234567890123456789=12121 2000000000000000? |

| Data in the magnetic card | Data in the QR code (same as magnetic card) when encrypted |
|---|---|
| %B1234567890123456789^ My Credit Card Holder Name ^12121200000000000000?;1234567890123456789=12121 2000000000000? | 5DFD0186414C89B3C371773B6B029D9B89A830A5489754 640F3B3A4CF2BD60D994218F3FA2192D17F4300D12305F6 A7438E8A434583590767O908EF6 |

SYSTEM AND METHOD FOR CONVEYING CARD DATA USING MATRIX BAR CODES

CROSS-REFERENCE TO RELATED APPLICATION(S)

This patent application is a continuation of U.S. patent application Ser. No. 14/830,129 entitled SYSTEM AND METHOD FOR CONVEYING CARD DATA USING MATRIX BAR CODES filed on Aug. 19, 2015 (U.S. Pat. No. 10,380,580), which claims the benefit of U.S. Provisional Patent Application No. 62/041,821 entitled SYSTEM AND METHOD FOR CONVEYING CARD DATA USING MATRIX BAR CODES filed on Aug. 26, 2014. Each of these applications is hereby incorporated herein by reference in its entirety.

TECHNICAL FIELD

The present invention relates to financial transactions using a portable card reader device that produces matrix bar codes on an in-built screen for scanning by an image capturing device.

BACKGROUND ART

There are many mobile card readers in the market available right now. These readers allow the user to swipe or dip a credit card/debit card/gift card with magnetic strip or smart chip and in turn convert the data from the card into electrical signals. Once the data is converted into electrical signals, it is transmitted to the mobile device (e.g., smart phone, tablet, PC) via audio jack, serial port, or other mobile device interface.

In particular, mobile card readers that interface with the mobile device via the audio jack have become almost ubiquitous. One issue with such devices is in developing or updating the device driver every time a new mobile device is released and ensuring that the audio protocols work on this device. If the audio protocols do not work, the driver needs to be updated. Among other things, this delays the ability to support a given mobile device with the card reader and also adds cost and complexity for the card reader provider.

Some companies have tried to avoid this issue by using Bluetooth for communication between the reader and the mobile device. Bluetooth has its own issues.

SUMMARY OF EXEMPLARY EMBODIMENTS

In accordance with one embodiment of the invention, a system for conveying and processing card data for a financial transaction associated with a financial transaction card comprises a card processing device configured to obtain card data associated with the financial transaction card, assemble data to be conveyed for the financial transaction based on the card data, produce a matrix bar code based on the assembled data, and display the matrix bar code on a display screen of the card processing device; and an image capturing device configured to capture a digital image of the matrix bar code from the display screen of the card processing device and to process the digital image of the matrix bar code for the financial transaction.

In accordance with another embodiment of the invention, a card processing device for conveying card data for a financial transaction associated with a financial transaction card comprises an interface for obtaining card data; a display screen; and a processor configured to obtain card data associated with the financial transaction card, assemble data to be conveyed for the financial transaction based on the card data, produce a matrix bar code based on the assembled data, and display the matrix bar code on the display screen.

In various alternative embodiments, the matrix bar code produced by the card processing device may encode at least a portion of the card data or instead may be a token that substitutes for the card data. The card processing device may have an in-built card reader device for obtaining the card data from the financial transaction card or may include an interface for receiving the card data from an external card reader device. The assembled data may include card data read from the financial transaction card that can be ascertained from viewing the financial transaction card, card data read from the financial transaction card that cannot be ascertained from viewing the financial transaction card, and/or ancillary data produced by the card processing device exclusive of the card data. The card processing device may be configured to encrypt at least a portion of the assembled data prior to producing the matrix bar code, for example, using a value that is changed by the card processing device each financial transaction. The card processing device may be configured to include in the matrix bar code a value that is changed by the card processing device each financial transaction. The card processing device may be configured to display on the display device a value that is changed by the card processing device each financial transaction. The card processing device may be configured to automatically erase the matrix bar code after a predetermined amount of time, in which case the card processing device additionally may be configured to display a countdown indicator on the display screen along with the matrix bar code and to automatically erase the matrix bar code when the countdown time expires. Additionally or alternatively, the card processing device may include a user-operable reset control allowing a user to manually cause erasure of the matrix bar code.

The image capturing device may decode the matrix bar code and transmit at least some of the decoded information (e.g., an account number and related information) to a backend processing system. Additionally or alternatively, the image capturing device may transmit the captured digital image of the matrix bar code to a backend processing system for decoding.

Additional embodiments may be disclosed and claimed.

BRIEF DESCRIPTION OF THE DRAWINGS

The foregoing features of embodiments will be more readily understood by reference to the following detailed description, taken with reference to the accompanying drawings, in which.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Embodiments of the present invention employ a card reader that converts card data (e.g., read from a magnetic strip or smart chip) into a matrix bar code (e.g., a Quick Response or QR code) that is displayed on a screen of the card reader (e.g., an LCD screen). The matrix bar code can then be captured or scanned by an image capturing device such as a mobile phone, eye glass with camera (like "Google glass"), a camera with network connection, or a traditional bar code scanner that has the ability to scan matrix bar codes. The image capturing device may process the matrix bar code locally and/or may transmit the captured matrix bar code to a backend processing system for processing. Thus, rather than transmitting card data to a smart phone or other device using the audio port, serial port, wireless communication connection, or other such means, embodiments of the present invention convey the card information through an image capture mechanism such as a camera. In some embodiments, the matrix bar code includes at least some encrypted information, in which case the image capturing device and/or the backend processing system may decrypt the encrypted information and direct further processing of the decrypted information, e.g., to complete a financial transaction such as purchase.

Figure 1:
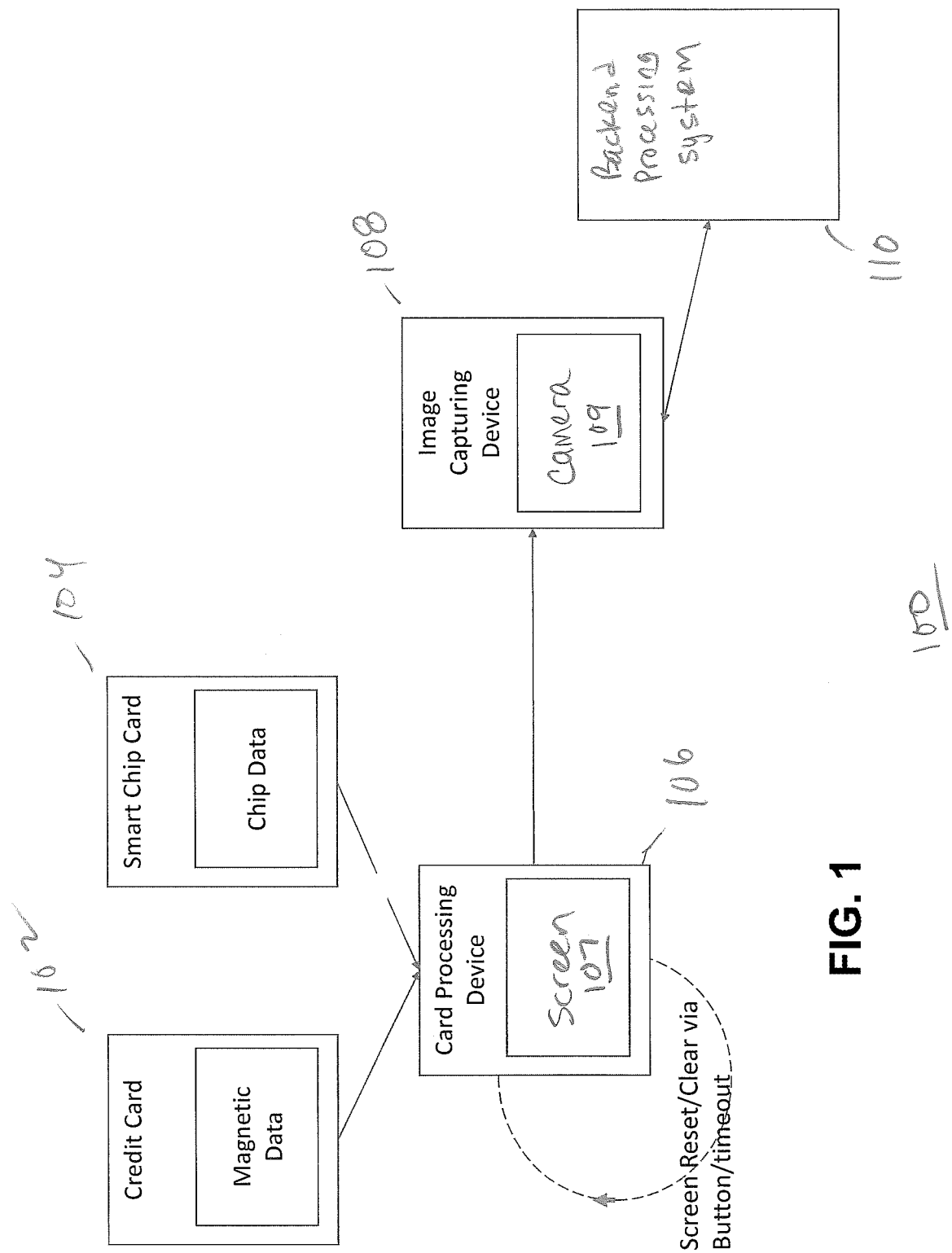
FIG. 1 is a schematic diagram showing an exemplary card processing system 100 in accordance with one exemplary embodiment of the present invention.

FIG. 1 is a schematic diagram showing an exemplary card processing system 100 in accordance with one exemplary embodiment of the present invention. Among other things, the card processing system 100 includes a card processing device 106 (also referred to herein as a "card reader"), an image capturing device 108, and a backend processing system 110.

Figure 2:
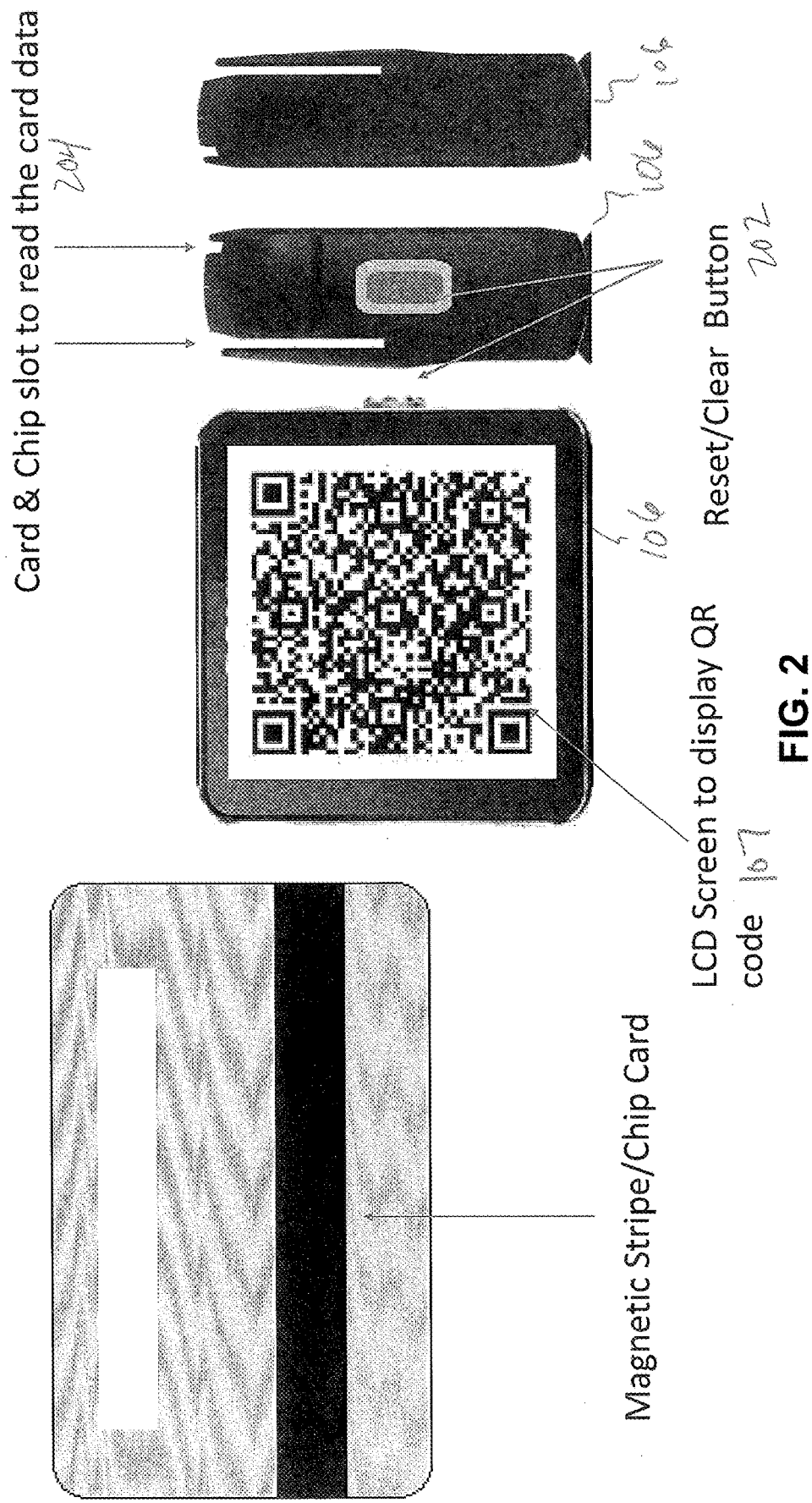
FIG. 2 is a schematic diagram showing an exemplary card processing device in accordance with one exemplary embodiment of the present invention.

FIG. 2 is a schematic diagram showing an exemplary card processing device 106 in accordance with one exemplary embodiment of the present invention. Among other things, the card processing device 106 includes a housing with devices/slots 204 to read card data, a screen 107 to display matrix bar codes and optionally other types of information, and an optional reset/clear button 202 for manually erasing a matrix bar code from the screen 107. The card processing device 106 also includes appropriate hardware and/or software (e.g., a specially-programmed microprocessor) to perform the various card processing operations described herein, such as obtaining card data, optionally encrypting data, generating a matrix bar code, and displaying the matrix bar code on the screen 107.

Figure 5:
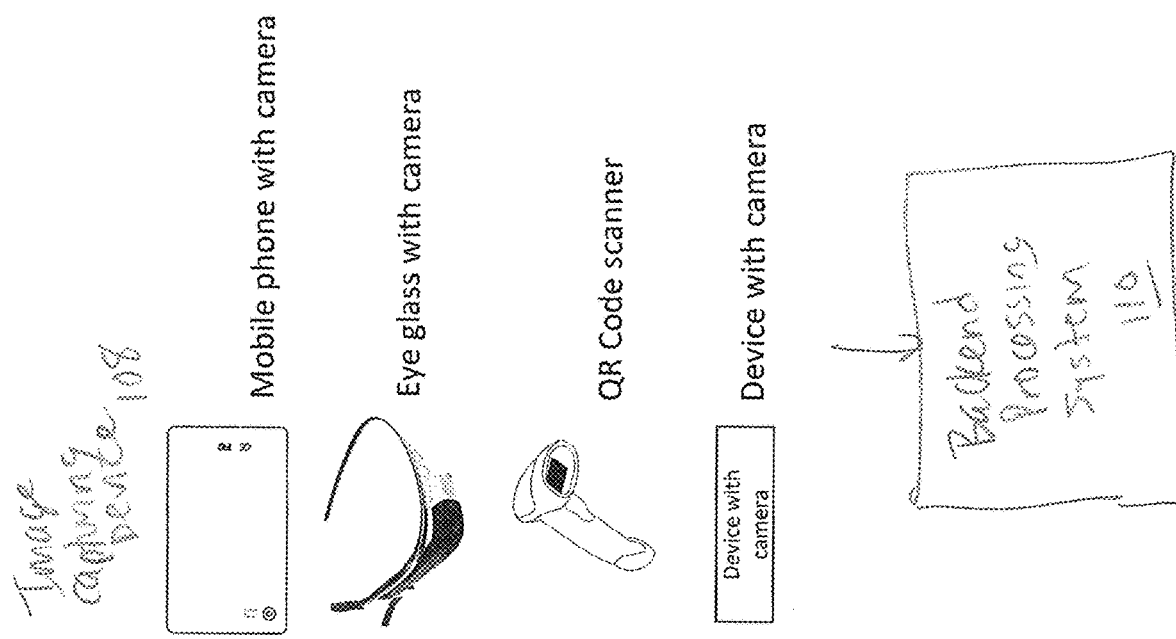
FIG. 5 is a schematic diagram showing the flow of a transaction, in accordance with one exemplary embodiment of the present invention.
Figure 5:
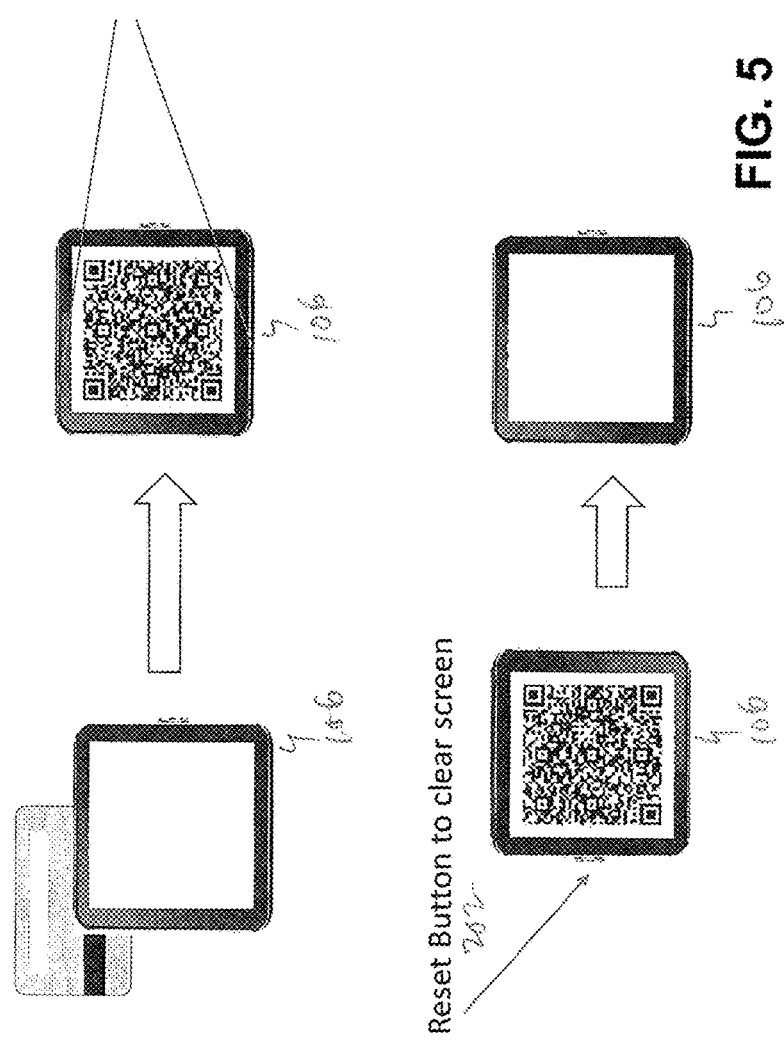

With reference to FIGS. 1 and 2, and as depicted schematically in FIG. 5, the card processing device 106 is capable of reading card data (e.g., an account number, subscriber name, issuer name/identifier, etc.) from a card such as a card 102 having a magnetic data stored on a magnetic strip or a smart chip card 104 having chip data stored on smart chip. Thus, for example, the card processing device 106 can include one or more card reader devices 204 such as a magnetic read head to read magnetic strip cards, a smart chip reader to read cards that have smart chip embedded in them, and/or a near-field communications (NFC) reader to read cards that have NFC communication capabilities. This card data can be in textual form or machine readable form and can be from any type of card, e.g., credit card, debit card, loyalty card, etc. The card processing device 106 processes the card data (e.g., to convert some or all of the card data into a sequence of characters), produces a matrix bar code including some or all of the characters (encrypted and/or unencrypted) and optionally including other information, and displays the matrix bar code on a screen 107 of the card processing device 106. The screen 107 may be an LCD display, LED display, e-ink display, or other electronic display medium through which the matrix bar code image can be displayed.

In order to use the card data, e.g., as part of a financial transaction such as a purchase, the matrix bar code displayed on the screen 107 of the card processing device 106 can then be scanned or captured by an image capturing device 108, such as a mobile phone with an inbuilt camera, an eye glass that can capture image like the "Google Glass", a camera that has the ability to connect to a network, or other device capable of scanning or capturing the matrix bar code. Thus, rather than transmitting card data to a smart phone or other device using the audio port, serial port, wireless communication connection, or other such means, embodiments of the present invention convey the card information through an image capture mechanism such as a camera 109. The image capturing device 108 can process the matrix bar code locally (e.g., decode/decrypt the matrix bar code) and transmit card data to the backend processing system 110, or the image capturing device 108 can transmit the matrix bar code to the backend processing system 110 for processing. For example, the image capturing device 108 may transmit a digital image of the matrix bar code to the backend processing system 110, e.g., in the form of a JPEG or TIFF file sent to the backend processing system 110 via a cellular connection, internet connection, email, text message, or other form of communication. Generally speaking, the image capturing device 108 includes an application (e.g., a mobile "app") to perform the various image capture operations described herein, such as capturing an image of the matrix bar code using a camera or other input device and processing the image of the matrix bar code, which may involve simply sending the image to the backend processing system 110 or may involve more complex processing such as decoding/decrypting the matrix bar code and sending card data (and optionally other data) to the backend processing system 110.

Whether the backend processing system 110 receives card data from the image capturing device 108 or recovers card data from an image of the matrix bar code received from the image capturing device 108, the backend processing system 110 may then process the card data such as for completing a financial transaction such as a purchase. In doing so, the backend processing system 110 may send card information and transaction information (e.g., a charged amount) to a bank or other financial processing service.

Figure 3:
FIG. 3 is a schematic diagram showing data read from a magnetic strip and corresponding unencrypted data represented in the matrix bar code.
Figure 3:
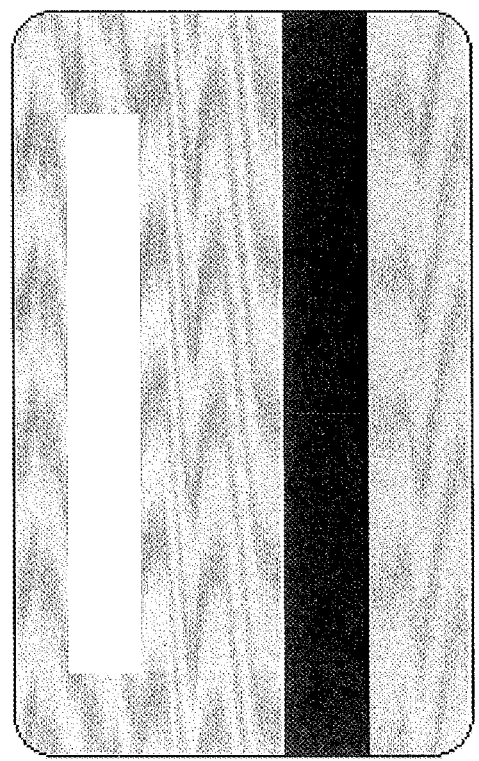
Figure 4:
FIG. 4 is a schematic diagram showing data read from a magnetic strip and corresponding encrypted data represented in the matrix bar code.
Figure 4:
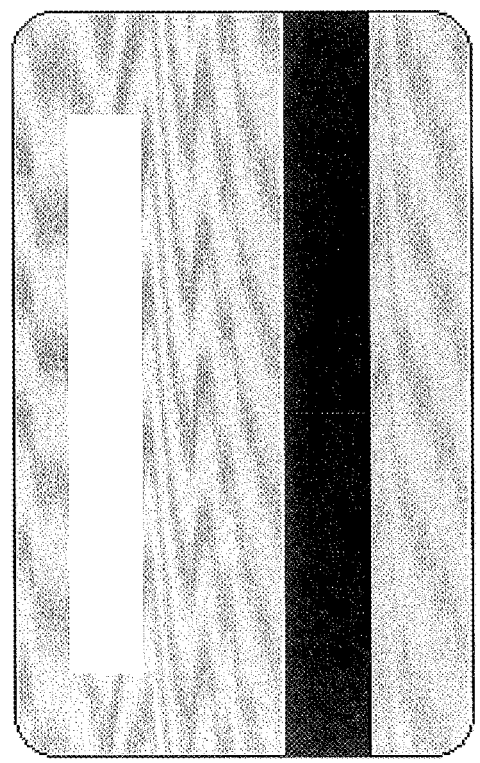

Some or all of the card data to be conveyed in the matrix bar code can be encrypted before the matrix bar code is produced and displayed on the screen 107, as depicted schematically in FIG. 4. For convenience, a matrix bar code will be considered encrypted when at least some of the data conveyed in the matrix bar code is encrypted. When a matrix bar code is encrypted, an application in the image capturing device 108 (e.g., a mobile "app") may decode/decrypt it in order to recover card data, or in certain alternative embodiments, the entire matrix bar code may be transmitted to the backend processing system 110 for decoding/decryption and processing. If the matrix bar code is unencrypted as represented schematically in FIG. 3, the card data is essentially displayed in the clear.

The matrix bar code generated by the card processing device 106 can include information such as card issuer (e.g., bank, store, etc.) and/or the card type (e.g., Visa, Mastercard, American Express, Discover, etc.) embedded to identify the type of card and thus provide added authenticity. Importantly, the matrix bar code can include information contained on the magnetic strip, smart chip, or NFC chip that is not accessible through visual inspection of the device. Including such "hidden" information in the matrix bar code can help to confirm that the card was actually present and "swiped."

To enable security, the matrix bar code generated by the card processing device 106 can have additional information, e.g., the time of card swipe, an expiration time stamp when the matrix bar code will expire, etc. Among other things, such additional information can have the effect of changing the matrix bar code each time the same card is read, thereby reducing the chances for things like duplicate transactions (e.g., where two or more transactions are inadvertently completed through a single swipe of the card) and replay attacks (e.g., where a third party captures a digital image of the matrix bar code on a separate image capturing device and tries to use the captured matrix bar code in fraudulent transactions).

Figure 6:
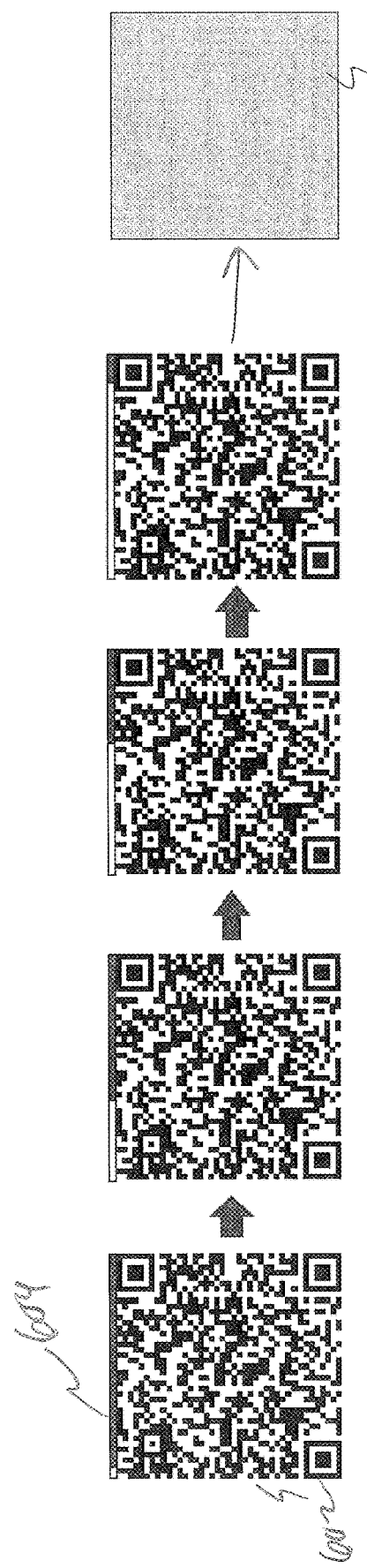
FIG. 6 is a schematic diagram showing a matrix bar code and progress bar in accordance with one exemplary embodiment.

In certain embodiments, the card processing device 106 has special logic to cause the matrix bar code to disappear from the screen 107 after a predetermined amount of time, e.g., so that the matrix bar code has a limited "lifetime" of use. The card processing device 106 also may clear any card data from internal memory. As depicted schematically in FIG. 6, the card processing device 106 may display on the screen 107 a matrix bar code 602 along with a countdown timer 604, e.g., in the form of a moving progress bar or other countdown timer, to indicate to the user that the matrix bar code will reset. When the countdown timer 604 expires, the card processing device 106 automatically erases the matrix bar code 602 from the screen 107. The card processing device 106 may then display other information on the screen 107, such as a customer logo.

In specific exemplary embodiments, the card processing device 106 also includes a reset/clear ability (e.g., a user-operable button 202, or if the screen 107 is a touch screen, the user-operable button could be a soft key displayed on the screen along with the matrix bar code or other touch-based operation such as "double-tapping" on the matrix bar code) so that a user can manually erase the matrix bar code from the screen 107, e.g., after the matrix bar code has been captured or scanned by the image capturing device 108. The card processing device 106 also may clear any card data from internal memory. Among other things, this will allow the screen to be cleared for subsequent cards to be used and also will allow the sensitive data to be cleared in case the user wishes to do so manually. The card processing device 106 may then display other information on the screen 107, such as a customer logo.

As discussed above, some or all of the information to be included in the matrix bar code may be encrypted by the card processing device 106. In various alternative embodiments, encryption may be accomplished using public key or symmetric key encryption (e.g., AES, Triple-DES, etc.). Such encryption may be between the card processing device 106 and the image capturing device 108 (i.e., the image capturing device 108 performs the decryption) or between the card processing device 106 and the backend processing system 110 (i.e., the backend processing system 110 performs the decryption). Because the card processing device 106 is essentially an input-only device (e.g., it generates the matrix bar code but generally does not receive information from other devices in the system 100), one or more encryption keys are generally pre-programmed into the card processing device 106, and such encryption key(s) are generally stored by or otherwise available to the decrypting device so that the card processing device 106 can encrypt information prior to generating the matrix bar code and the decoding device can decrypt such information from the matrix bar code.

Decrypting devices such as the image capture device 108 or backend processing system 110 generally can receive encrypted matrix bar codes from many different card processing devices, and therefore the decrypting device generally stores many different encryption keys. When the decrypting device receives an encrypted matrix bar code, the decrypting device must be able to select the correct encryption key to use for decryption. Therefore, in certain exemplary embodiments, each card processing device may be associated with a unique device identifier, and the card processing device 106 may include its device identifier in the matrix bar code (generally unencrypted). The decrypting device can then use the device identifier from the received matrix bar code to identify the card processing device 106 and then select the corresponding encryption key(s) to use for decryption.

In order to ensure that each card swipe generates a different set of encrypted card data, various exemplary embodiments may use a so-called "derive unique key per transaction" or DUKPT mechanism to effectively change the encryption key or encryption parameters for each card swipe. For example, certain embodiments may use a counter or other mechanism to generate a new key for each card swipe, e.g., by incrementing the counter each card swipe and then deriving an encryption key from a base key and the counter, or using the incremented counter as a "seed" to the encryption algorithm. The card processing device 106 may include the counter in the matrix bar code (generally unencrypted). The decrypting device can then use the counter value from the received matrix bar code to generate the appropriate key for decrypting the matrix bar code based on the corresponding base key and counter for the card processing device 106 that generated the encrypted matrix bar code.

The card processing device 106 may include other unencrypted information in an encrypted matrix bar code. For example, a portion of a credit card number (e.g., the last four digits) may be conveyed unencrypted in the encrypted matrix bar code. Among other things, this would allow the application in the image capture device to have access to certain information (e.g., the last four digits of the credit card number) even if the decryption is performed by the backend processing system 110.

In one exemplary alternative embodiment, the card processing device 106 may generate a matrix bar code image on the screen 107 that represents a token instead of the actual card data. This image is then scanned by the customer phone to be reused with other merchants. In this use case, the customer is replacing the matrix bar code for the actual card, thus decreasing the chance of fraud. In addition, this would also allow offline transactions to be performed by the merchant.

In another exemplary alternative embodiment, a smart phone device or other device configured to receive card data from a conventional card reader device (e.g., via audio port, serial port, Bluetooth, etc.) may be configured (e.g., via a new application developed to run in such device) to produce an encrypted or unencrypted matrix bar code and display the matrix bar code on the in-built display screen of the device, at which point such device may be utilized in the same manner as the card processing device 106 described above. For convenience, such a device also will be referred to herein as a card processing device even though the device itself may not include card reader devices per se. Specifically, once the matrix bar code is displayed on the screen, the matrix bar code may be scanned or captured by the image capture device 108 and processed in any of the ways described herein.

It should be noted that the conversion of data into a matrix bar code such as a QR code is well-known in the art, and computer software that performs such conversion is readily available. Such software can be readily developed for or integrated into any of the card processing devices discussed herein by persons of ordinary skill in the art. After the card processing device 106 obtains card data and formats the data to be conveyed in the matrix bar code (which may include encrypting some or all of the data in various exemplary embodiments), the data to be conveyed in the matrix bar code is processed by a matrix bar code conversion routine or module in order to produce and display the matrix bar code.

Figure 7:
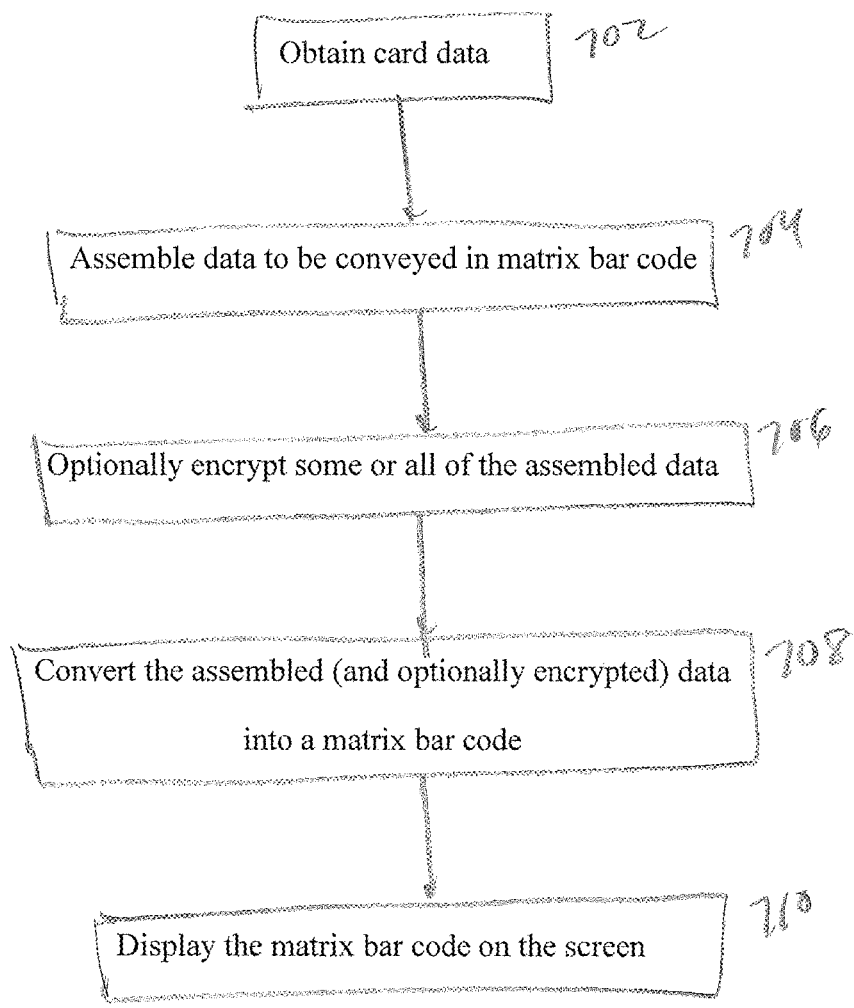
FIG. 7 is a logic flow diagram for producing converting card data into a matrix bar code by any of the card processing device discussed herein, in accordance with various exemplary embodiments of the present invention.

FIG. 7 is a logic flow diagram for producing converting card data into a matrix bar code by any of the card processing device discussed herein, in accordance with various exemplary embodiments of the present invention. In block 702, the device obtains card data, e.g., via an in-built card reader device (e.g., a magnetic read head, a smart chip reader, and/or a NFC reader) or from an external card reader device (e.g., via audio port, serial port, Bluetooth, etc.). In block 704, the device assembles data to be conveyed in the matrix bar code. As discussed above, the data typically includes some or all of the card data read from the card and also may include any of a variety of additional information, such as a device identifier, a counter, card issuer (e.g., bank, store, etc.), card type (e.g., Visa, Mastercard, American Express, Discover, etc.), the time of card swipe, an expiration time stamp when the matrix bar code will expire, etc. In block 706, the device optionally encrypts some or all of the assembled data. As discussed above, some information may be conveyed in the matrix bar code unencrypted while other information is conveyed in the matrix bar code encrypted. In block 708, the device converts the assembled (and optionally encrypted) data into a matrix bar code, e.g., by a matrix bar code conversion routine or module. In block 710, the matrix bar code is displayed on the screen.

Figure 8:
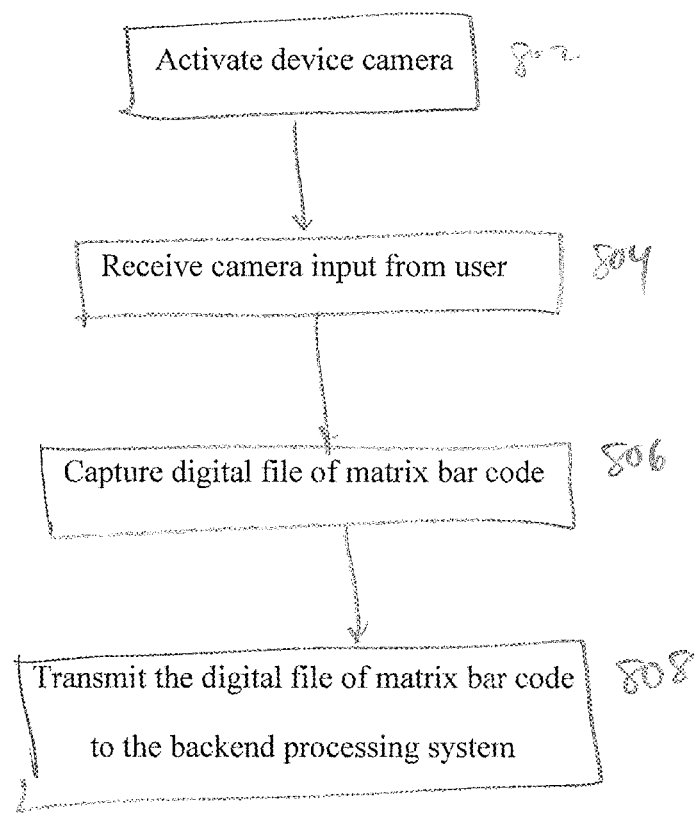
FIGS. 8 and 9 are logic flow diagrams for an image capturing device having a camera (e.g., a smart phone or tablet computer) and backend processing system, respectively, for an exemplary embodiment in which the backend processing system performs decoding and optional decryption of the matrix bar code.
Figure 9:
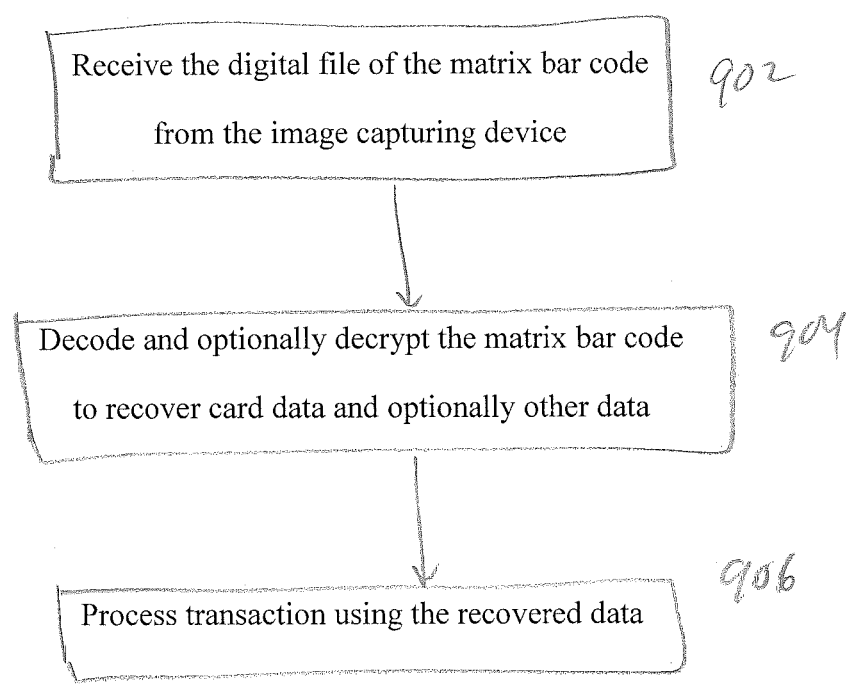

FIGS. 8 and 9 are logic flow diagrams for an image capturing device having a camera (e.g., a smart phone or tablet computer) and backend processing system, respectively, for an exemplary embodiment in which the backend processing system performs decoding and optional decryption of the matrix bar code.

With reference to FIG. 8, in block 802, the image capturing device actives the device camera and provides the user with controls (e.g., soft keys on a touch screen display) to operate the camera to take a picture of the matrix bar code displayed on the screen of the card processing device. In block 804, the image capturing device receives a camera input from the user indicating that a picture should be captured. In block 806, the image capturing device captures a digital image/file of the matrix bar code. In block 808, the image capturing device transmits the digital image/file of the matrix bar code to the backend processing system.

With reference to FIG. 9, in block 902, the backend processing system receives the digital image/file of the matrix bar code from the image capturing device, e.g., over a cellular connection, internet connection, email, text message, etc. In block 904, the backend processing system decodes the matrix bar code and optionally decrypts the matrix bar code as needed to recover card data and optionally other data. In block 906, the backend processing system processes the transaction using the recovered data. In doing so, the backend processing system may interface with other system, such as a bank or credit card company system.

Figure 10:
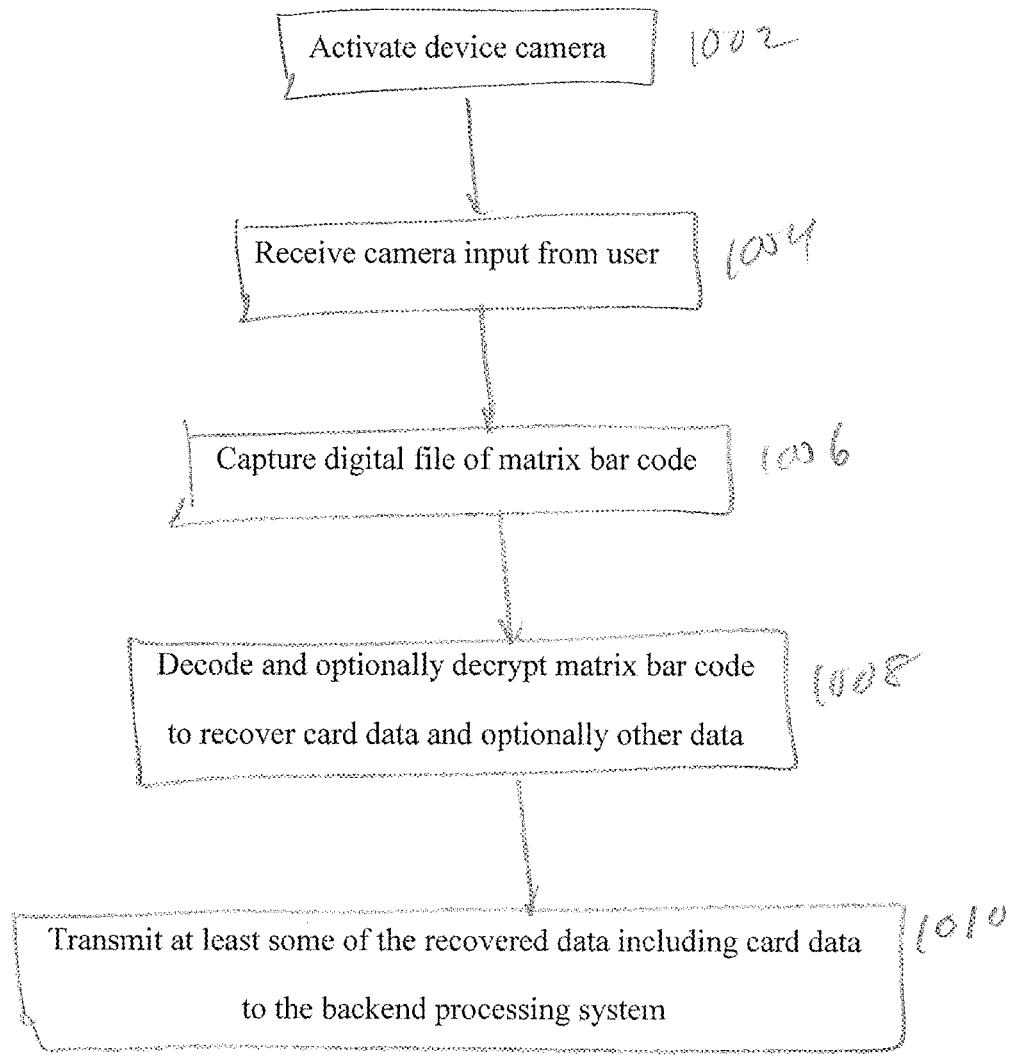
FIGS. 10 and 11 are logic flow diagrams for an image capturing device having a camera (e.g., a smart phone or tablet computer) and backend processing system, respectively, for an exemplary embodiment in which the image capturing device performs decoding and optional decryption of the matrix bar code.
Figure 11:
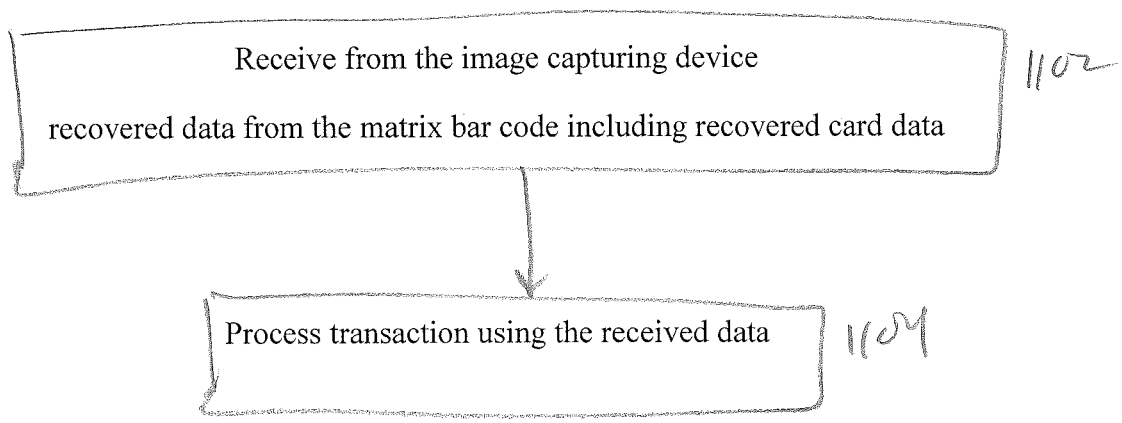

FIGS. 10 and 11 are logic flow diagrams for an image capturing device having a camera (e.g., a smart phone or tablet computer) and backend processing system, respectively, for an exemplary embodiment in which the image capturing device performs decoding and optional decryption of the matrix bar code.

With reference to FIG. 10, in block 1002, the image capturing device actives the device camera and provides the user with controls (e.g., soft keys on a touch screen display) to operate the camera to take a picture of the matrix bar code displayed on the screen of the card processing device. In block 1004, the image capturing device receives a camera input from the user indicating that a picture should be captured. In block 1006, the image capturing device captures a digital image/file of the matrix bar code. In block 1008, the image capturing device decodes the matrix bar code and optionally decrypts the matrix bar code as needed to recover card data and optionally other data. In block 1010, the image capturing device transmits at least some of the recovered data including card data to the backend processing system.

With reference to FIG. 11, in block 1102, the backend processing system receives from the image capturing device recovered data from the matrix bar code including recovered card data. In block 1104, the backend processing system processes the transaction using the received data. In doing so, the backend processing system may interface with other system, such as a bank or credit card company system.

Figure 12:
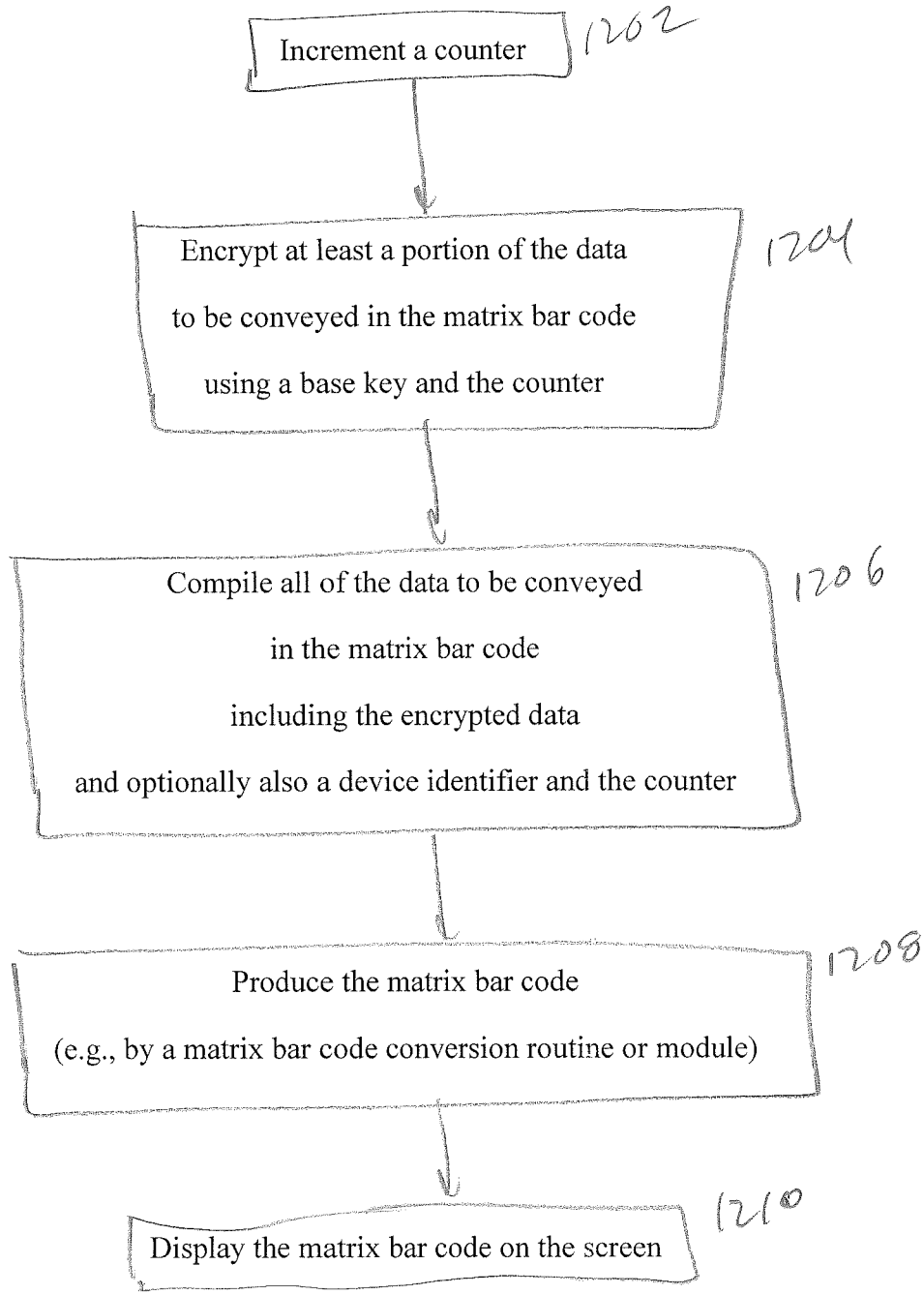
FIG. 12 is a logic flow diagram for producing an encrypted matrix bar code by a card processing device, in accordance with one particular exemplary embodiment of the present invention.

FIG. 12 is a logic flow diagram for producing an encrypted matrix bar code by a card processing device, in accordance with one particular exemplary embodiment of the present invention. In block 1202, the device increments a counter so that each swipe will encrypted to a different value when using a common base key. In block 1204, the device encrypts at least a portion of the data to be conveyed in the matrix bar code using a base key and the counter. In block 1206, the device compiles all of the data to be conveyed in the matrix bar code including the encrypted data and optionally also a device identifier and the counter. In block 1208, the device produces the matrix bar code from the compiled data, e.g., by a matrix bar code conversion routine or module. In block 1210, the device displays the matrix bar code on the screen.

Figure 13:
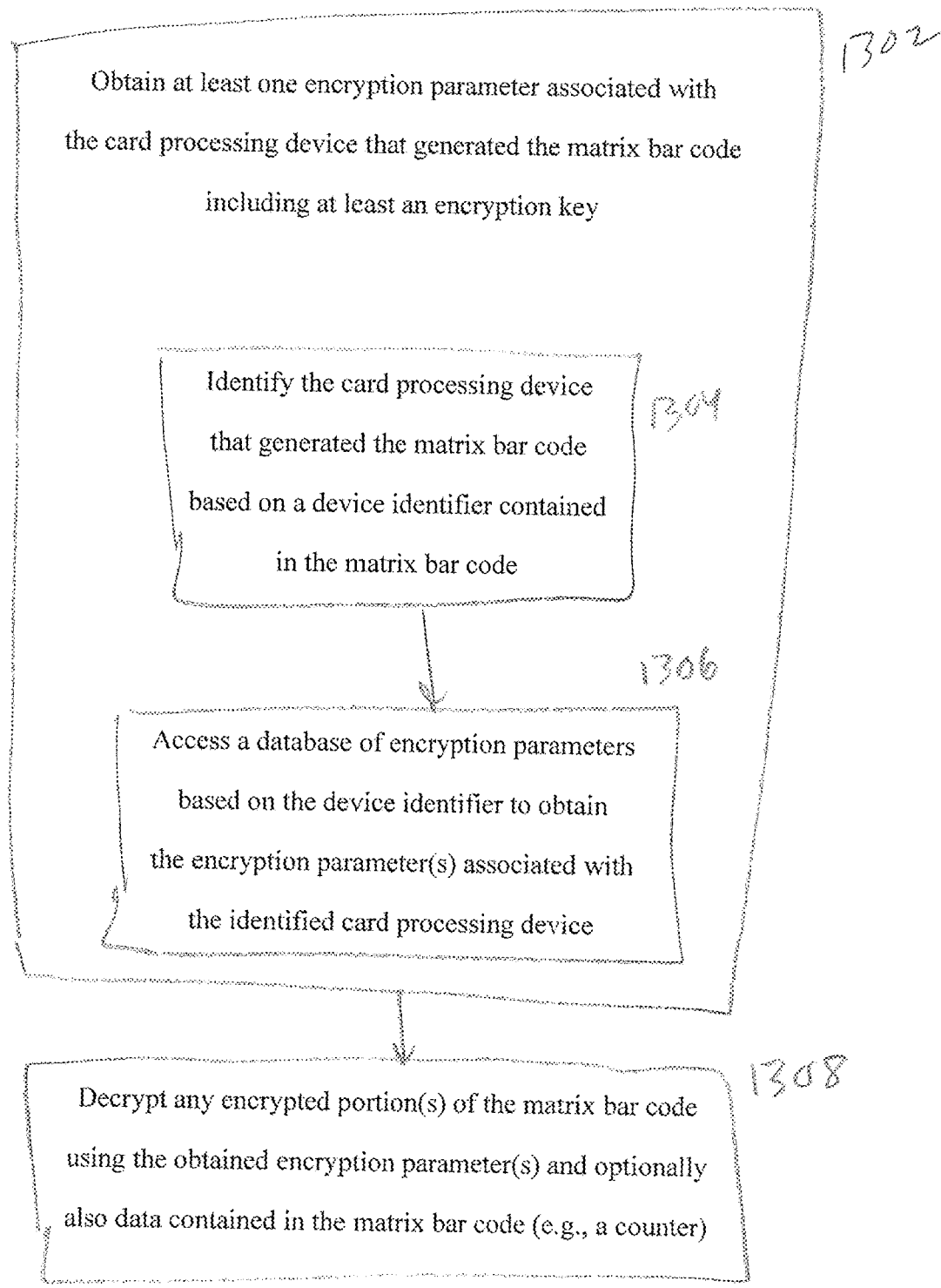
FIG. 13 is a logic flow diagram for producing an encrypted matrix bar code by a decrypting device such as the image capturing device or backend processing system, in accordance with one particular exemplary embodiment of the present invention.

FIG. 13 is a logic flow diagram for processing an encrypted matrix bar code by a decrypting device such as the image capturing device or backend processing system, in accordance with one particular exemplary embodiment of the present invention. In block 1302, the device obtains at least one encryption parameter associated with the card processing device that generated the matrix bar code including at least an encryption key. Obtaining at least one encryption parameter associated with the card processing device that generated the matrix bar code may involve (a) identifying the card processing device that generated the matrix bar code based on a device identifier contained in the matrix bar code and (b) accessing a database of encryption parameters based on the device identifier to obtain the encryption parameter(s) associated with the identified card processing device. In block 1308, the device decrypts any encrypted portion(s) of the matrix bar code using the obtained encryption parameter(s) and optionally also data contained in the matrix bar code (e.g., a counter).

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that terms such as "processing device," "capturing device," or "processing system" may be used herein to describe devices that may be used in certain embodiments of the present invention and should not be construed to limit the present invention to any particular device type unless the context otherwise requires. Such devices may include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICS or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the card processing devices, image capturing devices, and backend processing systems described herein) are necessarily non-conventional because, absent special programming or configuration, the conventional components do not inherently perform the described non-conventional methods.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A system for conveying and processing card data for a financial transaction associated with a presented financial transaction card, the system comprising:
   a card processing device comprising a card data input couplable to an external card reader device, the card processing device configured to obtain card data associated with the presented financial transaction card from the card data input, assemble data to be conveyed for the financial transaction including at least a portion of the card data, produce a matrix bar code encoding the assembled data, and display the matrix bar code on a display screen of the card processing device; and
   an image capturing device configured to capture a digital image of the matrix bar code from the display screen of the card processing device and to process the digital image of the matrix bar code for the financial transaction.

2. A system according to claim 1, wherein the card data input comprises an audio port input configured to receive card data from the external card reader device via audio signals.

3. A system according to claim 1, wherein the card data input comprises a wireless or wired interface.

4. A system according to claim 1, wherein the card processing device is configured to produce ancillary data exclusive of the card data and to include such ancillary data in the assembled data.

5. A system according to claim 1, wherein the card processing device is configured to encrypt at least a portion of the assembled data such that the matrix bar code encodes such encrypted data.

6. A system according to claim 1, wherein the card processing device is configured to encrypt at least a portion of the assembled data using a value that is changed by the card processing device each financial transaction.

7. A system according to claim 1, wherein the card processing device is configured to include in the matrix bar code a value that is changed by the card processing device each financial transaction.

8. A system according to claim 1, wherein the card processing device is configured to display on the display device a value that is changed by the card processing device each financial transaction.

9. A system according to claim 1, wherein the card processing device is configured to automatically erase the matrix bar code from the display screen after a predetermined amount of time.

10. A system according to claim 9, wherein the card processing device is configured to display a countdown indicator on the display screen along with the matrix bar code and to automatically erase the matrix bar code from the display screen when the countdown time expires.

11. A system according to claim 1, wherein the card processing device includes a user-operable reset control allowing a user to manually cause erasure of the matrix bar code from the display screen.

12. A system according to claim 1, wherein the image capturing device is a mobile device including a camera or other image capturing mechanism.

13. A system according to claim 1, wherein the image capturing device is configured to decode the matrix bar code and transmit at least some of the decoded information to a backend processing system.

14. A system according to claim 1, wherein the image capturing device is configured to transmit the captured digital image of the matrix bar code to a backend processing system.

15. A system according to claim 1, further comprising a backend processing system configured to receive from the image capturing device at least one of (a) decoded information from the matrix bar code or (b) the captured digital image of the matrix bar code, the backend processing system further configured to process the financial transaction based on the information received from the image capturing device.

16. A card processing device for conveying card data for a financial transaction associated with a presented financial transaction card, the card processing device comprising:
   a card data input couplable to an external card reader device;
   a display screen; and
   a processor configured to obtain card data associated with the presented financial transaction card from the card data input, assemble data to be conveyed for the financial transaction including at least a portion of the card data, produce a matrix bar code encoding the assembled data, and display the matrix bar code on the display screen, wherein the matrix bar code encodes at least a portion of the card data.

17. A device according to claim 16, wherein the card data input comprises an audio port input configured to receive card data from the external card reader device via audio signals.

18. A device according to claim 16, wherein the card data input comprises a wireless or wired interface.

19. A device according to claim 16, wherein the processor is configured to produce ancillary data exclusive of the card data and to include such ancillary data in the assembled data.

20. A device according to claim 16, wherein the processor is configured to encrypt at least a portion of the assembled data such that the matrix bar code encodes such encrypted data.

21. A device according to claim 16, wherein the processor is configured to encrypt at least a portion of the assembled data using a value that is changed by the processor each financial transaction.

22. A device according to claim 16, wherein the processor is configured to include in the matrix bar code a value that is changed by the processor each financial transaction.

23. A device according to claim 16, wherein the processor is configured to display on the display device a value that is changed by the processor each financial transaction.

24. A device according to claim 16, wherein the processor is configured to automatically erase the matrix bar code from the display screen after a predetermined amount of time.

25. A device according to claim 24, wherein the processor is configured to display a countdown indicator on the display screen along with the matrix bar code and to automatically erase the matrix bar code from the display screen when the countdown time expires.

26. A device according to claim 16, wherein the card processing device includes a user-operable reset control and wherein the processor is configured to erase the matrix bar code from the display screen upon receiving a user input via the user-operable reset control.

27. An image capturing device for conveying and processing card data for a financial transaction associated with a presented financial transaction card having card data, the image capture device comprising:
   an image capturing mechanism; and
   a processor configured to capture from a display screen of a card processing device of claim 16, using the image capturing mechanism, a digital image of a matrix bar code including encoded card data encoding at least a portion of the card data from the presented financial transaction card and to process the digital image of the matrix bar code for the financial transaction.

28. A device according to claim 27, wherein the processor is configured to decode the matrix bar code and transmit at least some of the decoded information to a backend processing system.

29. A device according to claim 27, wherein the processor is configured to transmit the captured digital image of the matrix bar code to a backend processing system.

30. A device according to claim 27, wherein the image capturing device is a mobile device, and wherein the image capturing mechanism includes a camera of the mobile device.

* * * * *